US008986050B2

(12) United States Patent
King et al.

(10) Patent No.: US 8,986,050 B2
(45) Date of Patent: Mar. 24, 2015

(54) CONNECTOR OF A UNIVERSAL SERIAL BUS DEVICE

(71) Applicant: Sandisk Technologies Inc., Plano, TX (US)

(72) Inventors: Anthony King, San Jose, CA (US); Robert C. Miller, San Jose, CA (US); Suresh Upadhyayula, San Jose, CA (US)

(73) Assignee: Sandisk Technologies Inc., Plano, TX (US)

( * ) Notice: Subject to any disclaimer, the term of this patent is extended or adjusted under 35 U.S.C. 154(b) by 81 days.

(21) Appl. No.: 13/841,934

(22) Filed: Mar. 15, 2013

(65) Prior Publication Data

US 2014/0273558 A1 Sep. 18, 2014

Related U.S. Application Data

(60) Provisional application No. 61/780,596, filed on Mar. 13, 2013.

(51) Int. Cl.
*H01R 13/648* (2006.01)
*G06K 19/077* (2006.01)

(52) U.S. Cl.
CPC ................................ *G06K 19/07743* (2013.01)
USPC ......... 439/660; 439/95; 439/607.34; 439/630

(58) Field of Classification Search
USPC ......................... 439/660, 95, 607.34, 92, 630
See application file for complete search history.

(56) References Cited

U.S. PATENT DOCUMENTS

| | | | | |
|---|---|---|---|---|
| 5,627,729 | A * | 5/1997 | Oldendorf et al. | 361/737 |
| 7,410,370 | B2 * | 8/2008 | Sprouse et al. | 439/95 |
| 7,581,967 | B2 * | 9/2009 | Collantes et al. | 439/131 |
| 7,810,235 | B2 * | 10/2010 | Sprouse et al. | 29/876 |
| 8,137,122 | B2 * | 3/2012 | Chen | 439/326 |
| 8,282,406 | B2 * | 10/2012 | Pipho et al. | 439/181 |
| 8,651,897 | B2 * | 2/2014 | Chen et al. | 439/660 |
| 2014/0080332 | A1 * | 3/2014 | Chung et al. | 439/95 |

OTHER PUBLICATIONS

Universal Serial Bus 3.0 Specification (including Errata and ECNs through May 1, 2011), Revision 1.0, Jun. 6, 2011, 531 pages.
Universal Serial Bus Specification, Revision 2.0, Apr. 27, 2000, 650 pages.
Universal Serial Bus Power Delivery Specification, Revision 1.0, including Errata through Oct. 31, 2012 (Version 1.1), Jul. 5, 2012, 308 pages.

* cited by examiner

*Primary Examiner* — Gary Paumen
(74) *Attorney, Agent, or Firm* — Toler Law Group, PC

(57) ABSTRACT

In a particular embodiment, a connector includes a connector module and a set of conductive connectors coupled to the connector module. The set of conductive connectors is configured to electrically couple to a set of contacts of a memory module. The connector also includes a ground contact coupled to the connector module. The ground contact is configured to be coupled to a ground of the memory module and to a conductive shroud.

18 Claims, 8 Drawing Sheets

CONNECTOR OF A UNIVERSAL SERIAL BUS DEVICE

CLAIM OF PRIORITY

This patent application claims priority from U.S. Provisional Patent Application No. 61/780,596 filed Mar. 13, 2013, the contents of which is incorporated by reference herein in its entirety.

FIELD OF THE DISCLOSURE

The present disclosure is generally related to a connector of a universal serial bus (USB) devices.

BACKGROUND

Non-volatile semiconductor memory devices, such as universal serial bus (USB) devices, have enabled increased portability of data and software applications. Various devices, such as computers, cameras, phones, personal digital assistants, and printers, have one or more connectors (e.g., plugs or receptacles) to receive USB devices for data storage and access. Conventionally, USB devices have complied with USB 2.0 connector designs that specific a number of contacts to transfer data and instructions between a USB device and a device (e.g., a computer).

As new standards are adopted, such as by The Universal Serial Bus Implementers Forum, Inc. (known as "USB-IF"), existing device designs may need to be modified to comply with the new standards. Modifying an existing device design presents problems that need to be resolved each time the existing device design is modified. For example, the existing device design may need to be modified to comply with multiple standards, such as one or more existing standards and a new standard. Further, modifying the existing design to comply with a new standard may increase a cost and a complexity of a device may increase a size of the device, and may present technological challenges not present in the existing design.

SUMMARY

A universal serial bus (USB) device may be configured to be coupled with a mating USB connector (e.g., a plug or a receptacle). The USB device may include a connectorized memory module and a conductive shroud (e.g., a metal shield). For example, the connectorized memory module may be loaded (e.g., rear loaded or front loaded) into the conductive shroud. The connectorized memory module may include a memory module (e.g., a single inline package memory (SIP)) coupled to a carrier. The connectorized memory module may be front inserted or rear inserted into the conductive shroud to form the USB device. The memory module may be configured to be compliant with a USB 2.0 standard, a USB 3.0 standard, or both standards. For example, the memory module may have a first set of contact pads based on the USB 2.0 standard, a second set of contact pads based on the USB 3.0 standard, or a combination thereof. In a particular embodiment, the memory module includes one or more ground pads configured to provide a ground path.

In a particular embodiment, the connectorized memory module includes one or more connectors coupled (e.g., soldered) to the memory module. The connectorized memory module may be formed by inserting the connector and the memory module into a first carrier (e.g., a plastic carrier). The connectorized memory module may be inserted into a conductive shroud to form a universal serial bus (USB) device, and the one or more ground contacts of the connector may provide a grounding path between the memory module and the conductive shroud. The ground contacts reduce noise to enable high speed signal transmission (e.g., for the USB 3.0 standard).

In another particular embodiment, the connectorized memory module includes a second carrier and the memory module. The second carrier may include a living hinge, one or more connectors (e.g., based on a USB standard), or a combination thereof. In a particular embodiment, the second carrier also includes one or more ground contacts. The connectorized memory module may be formed by inserting the memory module into the second carrier. The one or more connectors of the second carrier are in contact with one or more pads of the memory module. In a particular embodiment, the one or more connectors of the second carrier are in contact with one or more pads of the memory module but are not soldered to the one or more pads. Solderless connections reduce costs of manufacturing and may increase reliability. The conductive shroud may operate as a clamping force to enable one or more metal connectors of the second carrier to be in contact with one or more contact pads of the memory module. The connectorized memory module may be inserted (e.g., front inserted or rear inserted) into a conductive shroud to form a universal serial bus (USB) device.

DETAILED DESCRIPTION

Particular embodiments of the present disclosure are described below with reference to the drawings. In the description, common features are designated by common reference numbers throughout the drawings.

Figure 1:
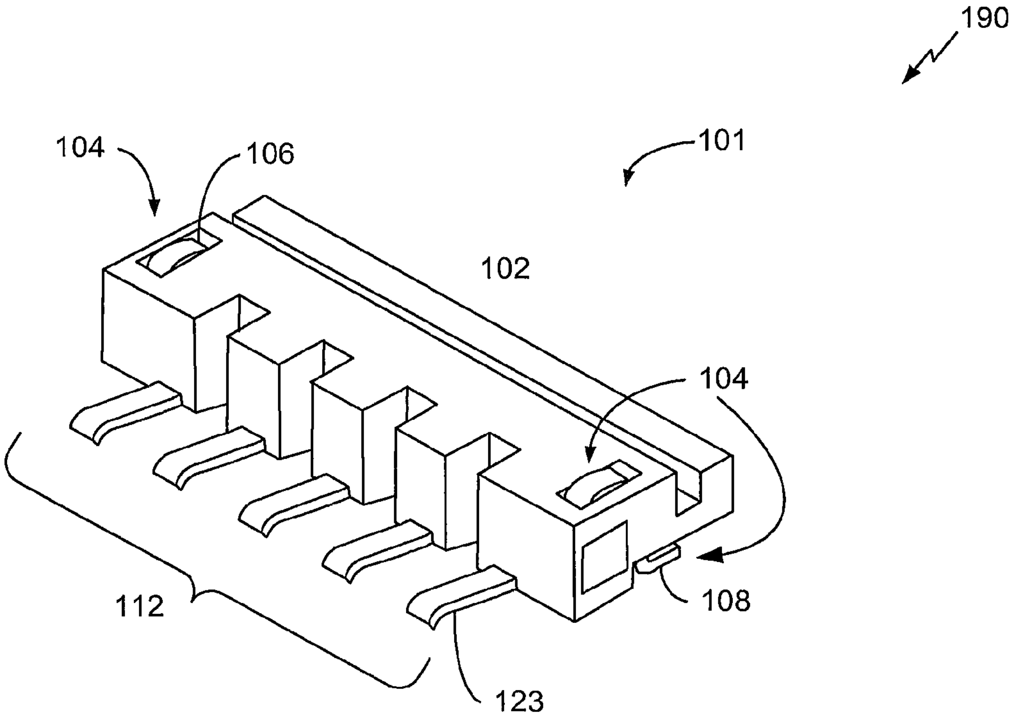
FIGS. 1 and 2 are views of an illustrative embodiment of a connector module configured to be coupled to a memory module.
Figure 2:
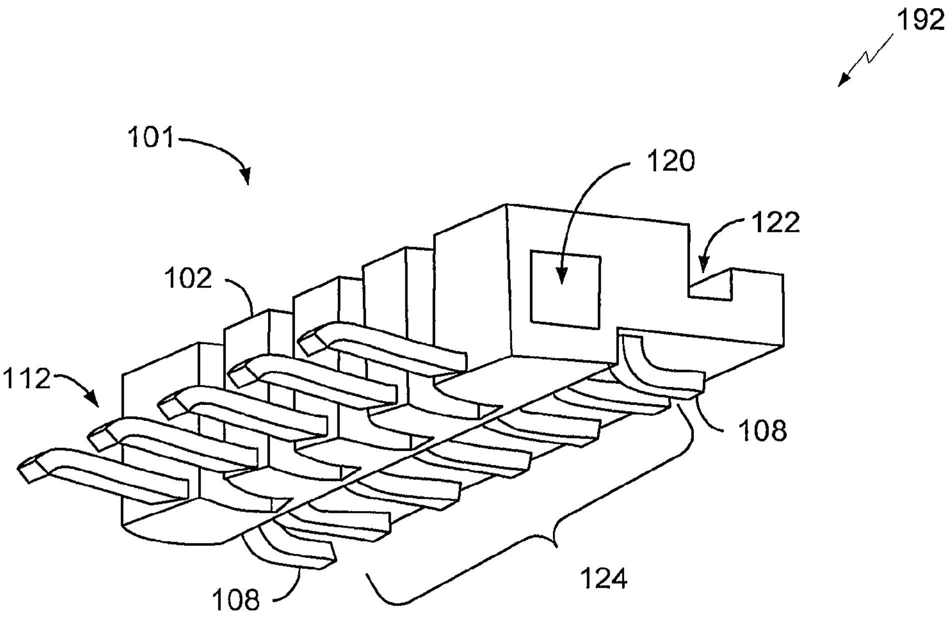

Referring to FIGS. 1 and 2, a first view 190 and a second view 192 of an embodiment of a connector 101 are shown. The connector 101 may be a modularized connector that may be coupled to a memory module to form a connectorized memory module. The connectorized memory module may be inserted into a conductive shroud (e.g., a metal shield) to form a universal serial bus (USB) device, as described with reference to FIGS. 13-15. When included in the USB device, the connector 101 may be configured to provide a grounding path between the memory module and the conductive shroud, as described with reference to FIGS. 13-15. The connector 101 includes a connector module 102, one or more conductive connectors 112, and one or more ground contacts 104.

The one or more conductive connectors 112 (e.g., metal contacts) may each include a first portion configured to be coupled to a mating connector (e.g., a USB plug or a USB receptacle) and a second portion configured to be coupled (e.g., electrically coupled) to a contact (e.g., a pad contact) of a memory module. For example, the first portion of the conductive connector 112 may function as an interface contact 123, and the second portion of the conductive connector 112 may function as a pad connector 124. The one or more conductive connectors 112 may be spaced apart a distance defined by a standard, such as the USB 3.0 standard.

The one or more ground contacts 104 (e.g., metal contacts) may each include a first portion configured to be coupled with a shell (e.g., a conductive shroud) and a second portion configured to be coupled to a ground (e.g., a ground pad) of a memory module. For example, the first portion of the ground contact 104 may function as a shell ground contact 106 that is configured to contact a shell of a USB device, and the second portion of the ground contact 104 may function as a pad ground contact 108, respectively. The one or more ground contacts 104 may be configured to provide a ground path, such as an electrostatic discharge (ESD) path, between the memory module and the conductive shroud.

The connector module 102 may include one or more recesses 120 and a channel 122. For example, as shown in the second view 192, a first end of the connector module 102 may include the recess 120. Additionally, a second end of the connector module opposite the first end may include another recess. The one or more recesses 120 may be configured to couple with one or more locking tabs of a conductive shroud and secure the connector module 102 with respect to the conductive shroud, as described with reference to FIGS. 13-15.

A channel 122 may extend an entire length of the connector module 102, such as from the first end of the connector module 102 to the second end of the connector module 102. Alternatively, the channel 122 may extend a portion of the entire length. The channel 122 (e.g., a trough) may be configured to be coupled with (e.g., slide into) a lip of a carrier, as described with respect to FIGS. 7 and 8.

The connector module 102 may be formed (e.g., molded) of plastic. The connector module 102 may be molded around the one or more conductive connectors 112, the one or more ground contacts 104, or a combination thereof. For example, the one or more conductive connectors 112, the one or more ground contacts 104, or a combination thereof, may be included in a strip. The connector module 102 may be molded around the strip. Alternatively or in addition, the one or more conductive connectors 112, the one or more ground contacts 104, or a combination thereof, may be press fit into the molded connector module 102.

Figure 3:
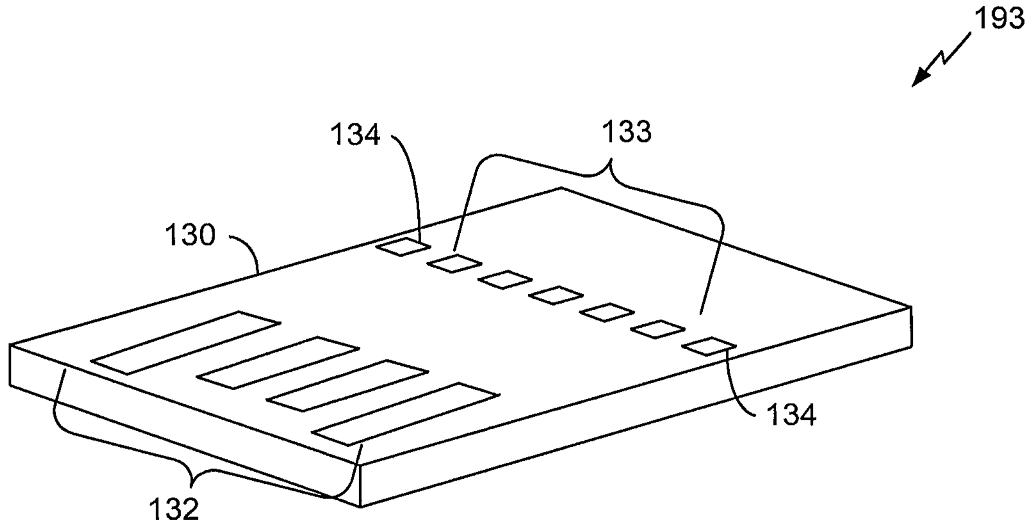
FIG. 3 is a diagram of an illustrative embodiment of a memory module.

Referring to FIG. 3, a view 193 of an illustrative embodiment of a memory module 130 is shown. In a particular embodiment, the memory module may include a single inline package (SIP) memory. The memory module 130 may be configured to be compliant with a USB 2.0 standard, a USB 3.0 standard, or a combination thereof.

The memory module 130 may include one or more contacts, such as first pad contacts 132, second pad contacts 133, one or more ground pads 134 (e.g., a ground), or a combination thereof. For example, the first pad contacts 132 may be compliant with the USB 2.0 standard, and the second pad contacts 133 may be compliant with the USB 3.0 standard. In a particular embodiment, the first pad contacts 132 include four contact pads. In another particular embodiment, the second pad contacts 133 include five contact pads. The one or more ground pads 134 may be positioned on a same surface of the memory module 130 as the first pad contacts 132, the second pad contacts 133, or a combination thereof. Additionally or alternatively, at least one ground pad of the one or more ground pads 134 may be positioned on a different surface than a surface of the memory module 130 that supports the first pad contacts 132, the second pad contacts 133, or a combination thereof. The one or more ground pads 134 may be coupled to a conductive shroud directly or via a connector, such as the ground contact 104 of FIG. 1 or a metal conductor (e.g., a wire).

The memory module 130 may include a controller coupled to a memory array. For example, the controller may be programmed to receive USB protocol instructions and data from a USB interface of a device (e.g., an external host device). The memory array may include one or more types of storage media such as a flash memory, a one-time programmable memory, other memory, or any combination thereof. In a particular embodiment, the memory module 130 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory. The memory array may be coupled to one or more of the first pad contacts 132, the second pad contacts 133, the one or more ground pads 134, or a combination thereof. The controller 1718 may include a hardware processor that executes instructions stored at an internal memory, such as a read-only memory to enable receipt and acknowledgment of USB instructions and data.

Figure 4:
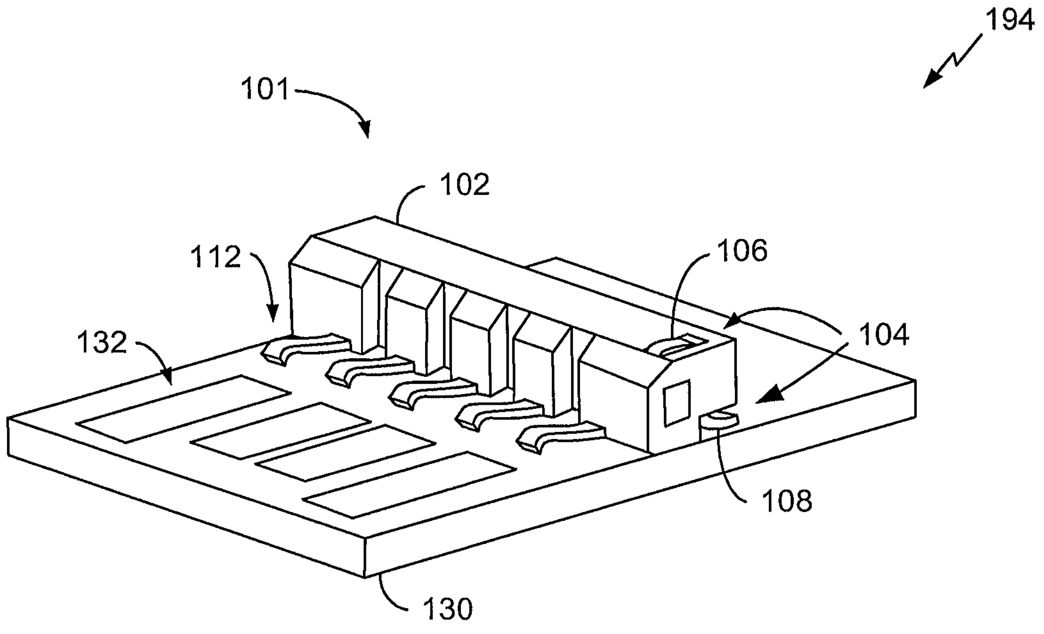
FIG. 4 is a diagram of an illustrative embodiment of the connector of FIGS. 1 and 2 coupled to the memory module of FIG. 3.

FIG. 4 depicts a view 194 of an illustrative embodiment of the connector 101 of FIGS. 1 and 2 coupled to the memory module 130 of FIG. 3. The connector 101 may be coupled to the memory module 130 via one or more solder connections. One or more pad connectors 124 of the conductive connectors 112 may be soldered or otherwise fixed to one or more of the second pad contacts 133. Additionally or alternatively, the one or more pad ground contacts 108 or the one or more ground contacts 104 may be soldered or otherwise fixed to the one or more ground pads 134. As depicted in FIG. 4, the connector module 102 includes one ground contact 104, however, the connector module 102 may include one or more additional ground contacts.

The memory module 130 may be configured to be coupled to a USB 3.0 compliant connector (not shown), such as a USB 3.0 Standard-A receptacle via the conductive connectors 112 (e.g., the interface contacts 123). Alternatively or in addition, the memory module 130 may be configured to be coupled to a USB 2.0 compliant connector (not shown) such as a USB 2.0 Standard-A receptacle via the first pad contacts 132.

Figure 5:
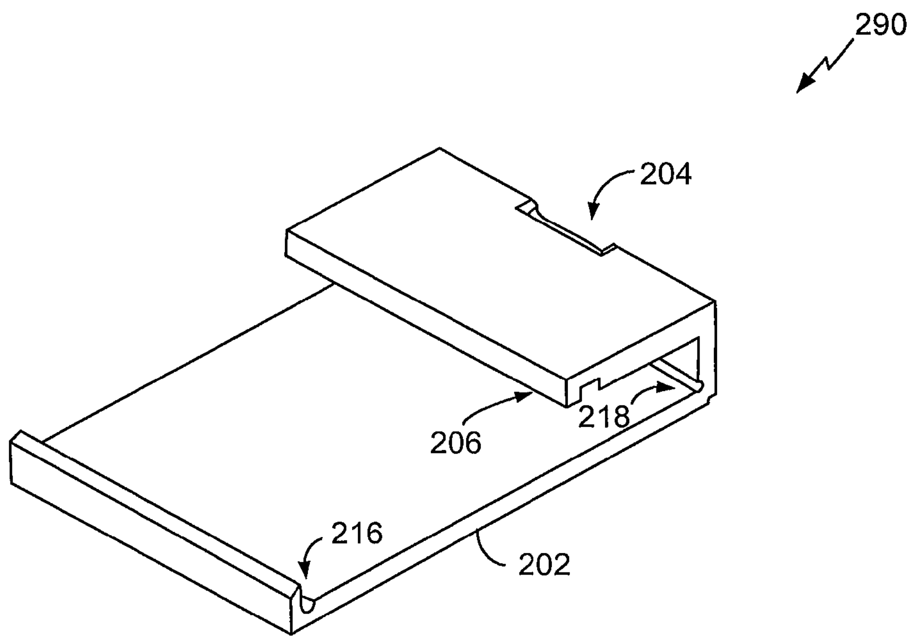
FIGS. 5 and 6 are views of an illustrative embodiment of a first carrier configured to receive the connector of FIGS. 1 and 2 and the memory module of FIG. 3.
Figure 6:
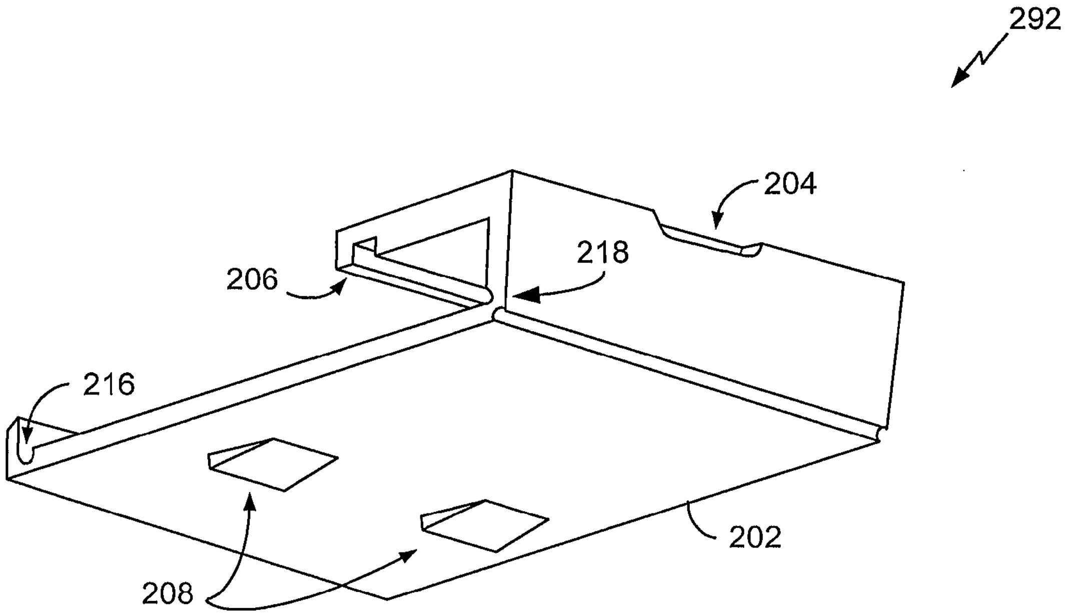

Referring to FIGS. 5 and 6, a first view 290 and a second view 292 of an embodiment of a carrier 202 are shown. The carrier 202 may include a lip 206, a recess 204, and one or more protrusions 208 (e.g., tabs). The carrier 202 may have one or more rounded edges 216, 318 (e.g., one or more recesses) to enable a memory module (e.g., having edges that are substantially ninety degrees), such as the memory module 130 of FIG. 3, to fit in the carrier 202.

The lip 206 may be configured to engage a connector, such as the connector 101 of FIGS. 1 and 2. For example, the lip 206 may engage the channel 122 of the connector 101, as described with respect to FIGS. 7 and 8. In a particular embodiment, the lip 206 engages the channel 122 of the connector 101 while the connector 101 is coupled to a memory module, such as the memory module 130 of FIG. 3.

The recess 204 and the one or more protrusions 208 may be configured to couple to a locking tab and one or more recesses of a conductive shroud to secure the carrier 202 with respect to the conductive shroud, as described with reference to FIGS. 13-15.

Figure 7:
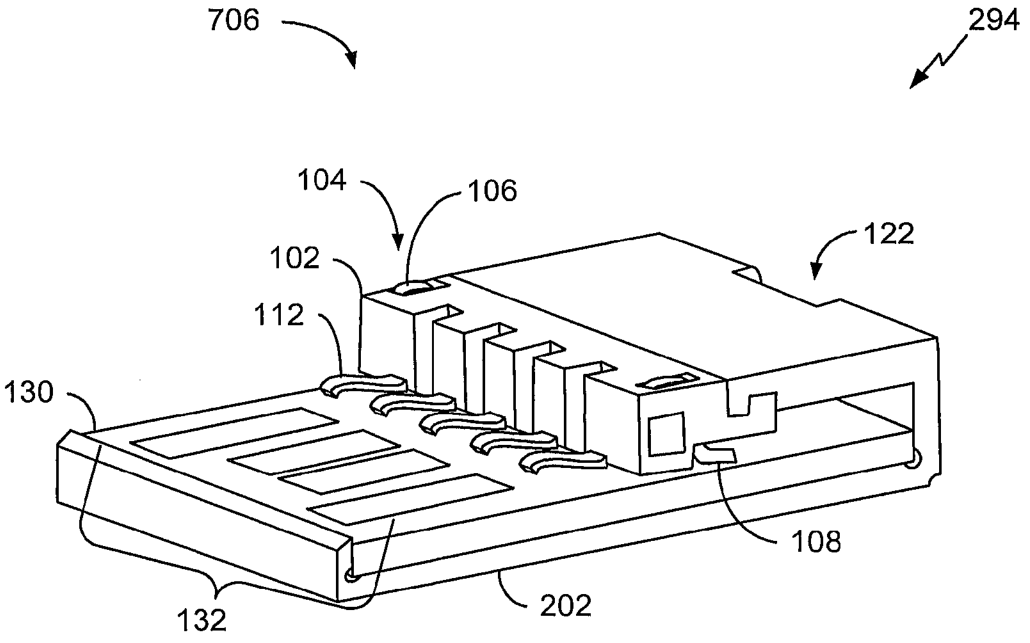
FIGS. 7 and 8 are views of an illustrative embodiment of a first connectorized memory module including the connector of FIGS. 1 and 2, the memory module of FIG. 3, and the first carrier of FIGS. 5 and 6.
Figure 8:
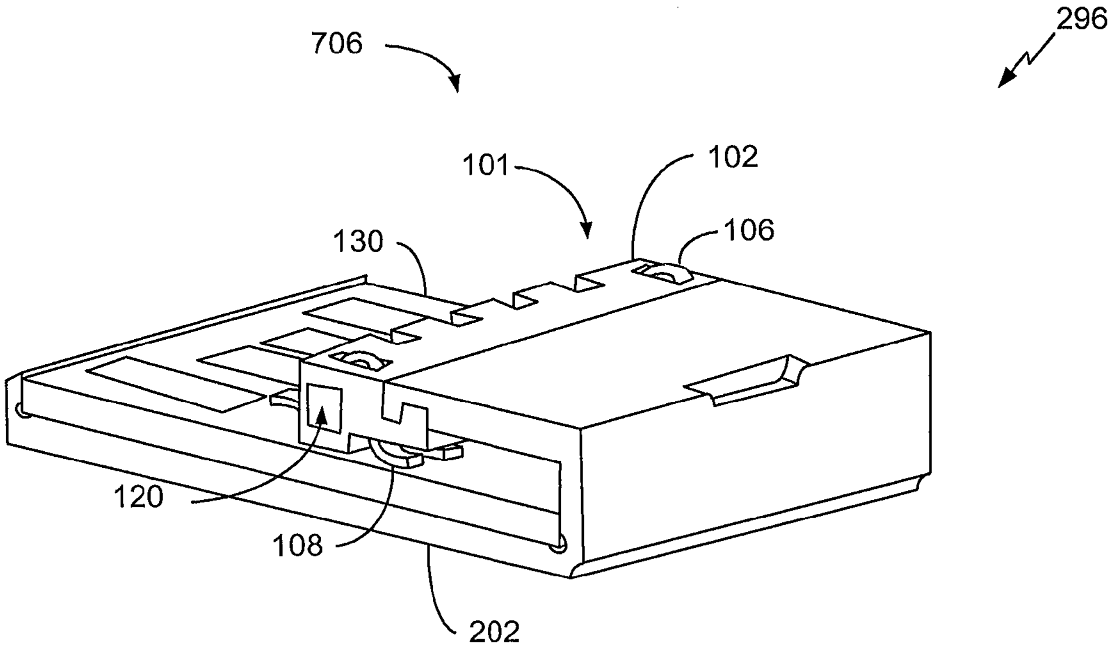

Referring to FIGS. 7 and 8, a first view 294 and a second view 296 of an embodiment of a connectorized memory module 706 are shown. The connectorized memory module 706 may include the connector 101 of FIGS. 1 and 2, the memory module 130 of FIG. 3, and the carrier 202 of FIGS. 5 and 6.

The connector 101 may be coupled to the carrier 202 by sliding or otherwise inserting the channel 122 of the connector module 102 into contact with the lip 206 of the carrier 202. The connector 101 and the memory module 130 may be inserted as a single unit into the carrier 202, such as the connector 101 coupled to the memory module 130, as shown and described with reference to FIG. 4.

As shown in the first view 294 and the second view 296, when the connector 101 and the memory module 130 are inserted into the carrier 202, the one or more shell ground contacts 106 may provide a ground path (e.g., a discharge path) between the ground pad 134 of the memory unit and a conductive shroud (not shown). For example, the carrier 202 including the connector 101 and the memory module 130 may be inserted into a conductive shroud (e.g., a shell), as described with reference to FIGS. 13-15. Additionally, the conductive connectors 112 (e.g., the interface contacts 123 of FIG. 1) and the first pad contacts 132 may be configured to be coupled to a mating connector (not shown), such as a USB 2.0 compliant receptacle or a USB 3.0 compliant receptacle. In a particular embodiment, the conductive connectors 112 are compliant with the USB 3.0 standard and the first pad contacts 132 are compliant with the USB 3.0 standard and the USB 2.0 standard.

Figure 9:
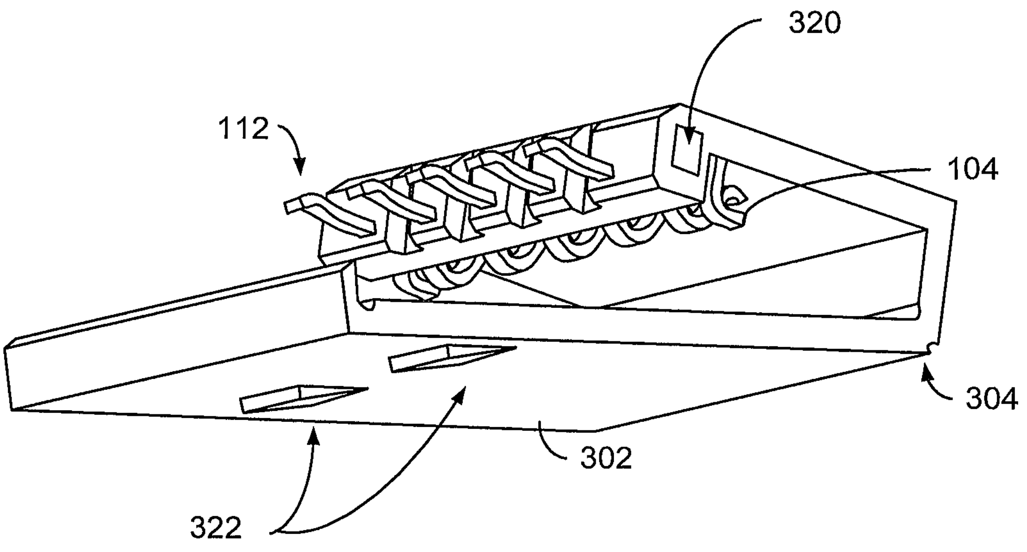
FIGS. 9 and 10 are views of an illustrative embodiment of a second carrier configured to receive the memory module of FIG. 3.
Figure 10:
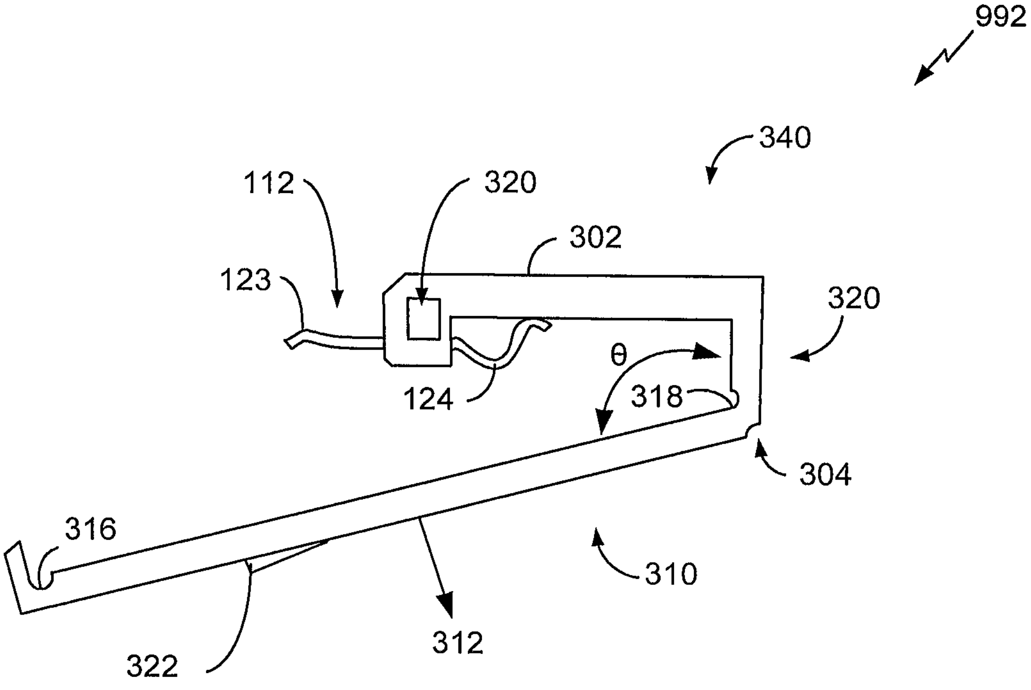

Referring to FIGS. 9 and 10, a first view 990 and a second view 992 of embodiments of a carrier 302 are shown. The carrier 302 may include one or more conductive connectors 112, the one or more ground contacts 104, one or more recesses 320, one or more protrusions 322, and a hinge 304 (e.g., a living hinge). The carrier 302 may be configured to receive a memory module, such as the memory module 130 of FIG. 3, as described with respect to FIGS. 11 and 12. The carrier 302 may have one or more rounded edges/recesses 316, 318 to enable the memory module (e.g., having edges that are substantially ninety degrees) to fit in the carrier 302.

The one or more recesses 320 and the one or more protrusions 322 may be configured to couple with a locking tab and one or more recesses of a conductive shroud to secure the carrier 302 with respect to (e.g., within) the conductive shroud, as described with reference to FIGS. 13-15. In a particular embodiment, the one or more recesses 320 may operate in a manner similar to the recess 120 of FIG. 1, the recess 204 of FIGS. 5 and 6, or a combination thereof. In a particular embodiment, the recess 320 includes a metal contact that is coupled to the one or more ground contacts 108 or includes an opening to the one or more ground contacts 104.

The one or more protrusions 322 may operate in a manner similar the protrusions 208 of FIGS. 5 and 6.

The carrier 302 may be formed (e.g., molded) of plastic. The carrier 302 may be molded around the one or more conductive connectors 112, the one or more ground contacts 104, or a combination thereof. For example, the one or more conductive connectors 112, the one or more ground contacts 104, or a combination thereof, may be included in a strip. The carrier 302 may be molded around the strip. Alternatively or in addition, the one or more conductive connectors 112, the one or more ground contacts 104, or a combination thereof, may be press fit into the molded carrier 302. Although the carrier 302 is depicted as being formed of a single piece of molded plastic, the carrier 302 may include one or more molded pieces of plastic that are configured to be coupled together. The one or more conductive connectors 112, the one or more ground contacts 104, or a combination thereof, may be configured to provide a solderless connection to one or more contacts of a memory module, such as the memory module 130 of FIG. 3, as described with reference to FIGS. 11 and 12. Referring to FIG. 10, a particular embodiment of the carrier 302 is shown in which the carrier 302 does not include one or more ground contacts 104.

The carrier 302 may include one or more hinges, such as the hinge 304. The hinge 304 may include a portion of the carrier 302 that includes a thickness that is thinner than a thickness of a material(s) coupled to the hinge 304. The hinge 304 may enable a first portion 310 of the carrier 302 to hinge (e.g., bend) relative to a second portion 320 of the hinge 302. Alternatively or in addition, the hinge 304 may be positioned at a location to enable a third portion 340 of the carrier 302 to hinge relative to the second portion 320. In a normal operating state, an angle (θ) between the first portion 310 and the second portion 320 is approximately ninety degrees. The first portion 310 may be hinged away (e.g., in a direction indicated by an arrow 312) from the second portion 320 such that the angle (θ) between the first portion 310 and the second portion 320 is greater than ninety degrees. When the angle is greater than ninety degrees, a memory module, such as the memory module 130 of FIG. 3, may be slid or otherwise inserted into the carrier 302.

Figure 11:
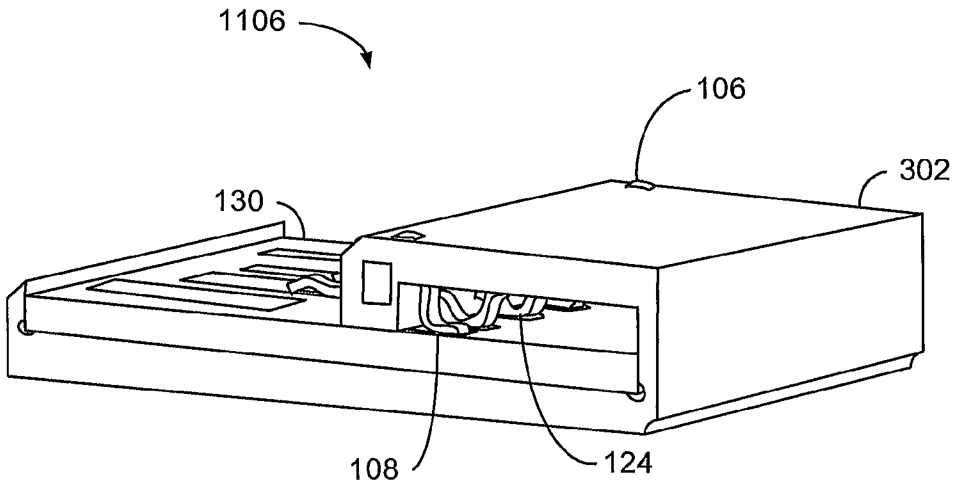
FIGS. 11 and 12 are views of an illustrative embodiment of a second connectorized memory module including the second carrier of FIGS. 9 and 10 and the memory module of FIG. 3.
Figure 12:
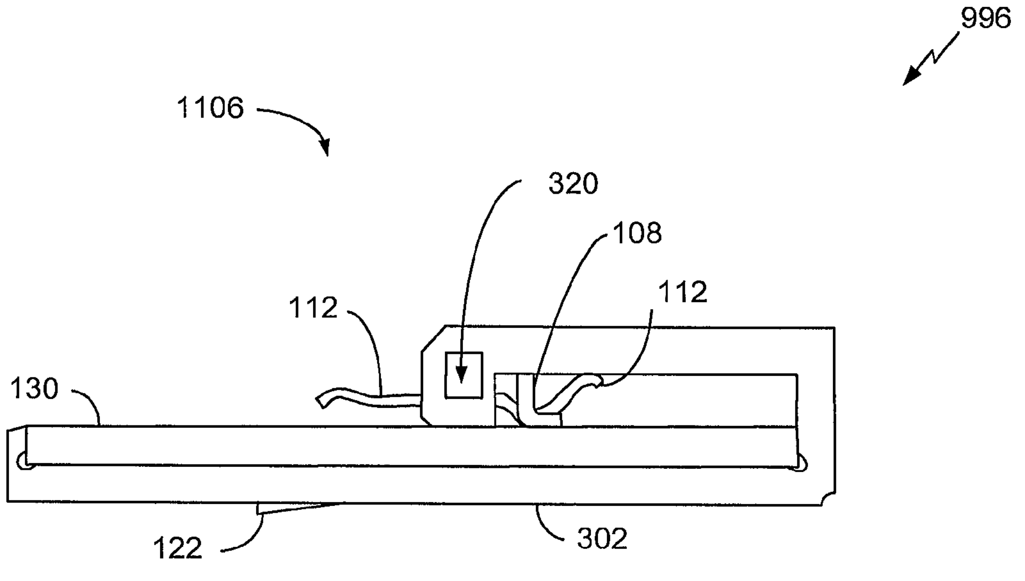

Referring to FIGS. 11 and 12, a first view 994 and a second view 996 of an example of a connectorized memory module 1106 are shown. The connectorized memory module 1106 may include the memory module 130 of FIG. 3 and the carrier 302 of FIGS. 9 and 10.

The memory module 130 may be coupled to the carrier 302 by sliding or otherwise inserting the memory module 130 into the carrier 302. When the memory module 130 is inserted into the carrier 302, the one or more conductive connectors 112, the one or more ground contacts 104, or a combination thereof, may be in contact with one or more pads of the memory module 130, such as the first pad contacts 132, the second pad contacts 133, or the one or more ground pads 134.

As shown in the first view 994 and the second view 996, when the memory module 130 is inserted into the carrier 302, the one or more shell ground contacts 106 may provide a ground path (e.g., a discharge path) between the ground pad 134 of the memory module 130 and a conductive shroud (not shown). For example, the connectorized memory module 1106 may be inserted into a conductive shroud (e.g., a shell), as described with reference to FIGS. 13-15. When the connectorized memory module 1106 is inserted into the conductive shroud, the conductive shroud may provide a clamping force to enable one or more of the conductive connectors 112, one or more of the ground contacts 104, or a combination thereof, to maintain an electrical connection (e.g., a low resistance electrical connection) with one or more pads of the memory module 130, such as the first pad contacts 132, the second pad contacts 133, or the one or more ground pads 134. The connectorized memory module 1106 may be referred to as a solderless connectorized memory module because one or more electrical connections between the conductive contacts 112 of the carrier 302 and the memory module 130 exist without the use of solder.

Additionally, the conductive connectors 112 (e.g., the interface contacts 123 of FIG. 1) and the first pad contacts 132 may be configured to be coupled to a USB compliant connector (not shown), such as a USB 2.0 Standard-A receptacle or a USB 3.0 Standard-A receptacle. In a particular embodiment, the conductive connectors 112 are compliant with the USB 3.0 standard and the first pad contacts 132 are compliant with the USB 2.0 standard and the USB. 3.0 standard.

Figure 13:
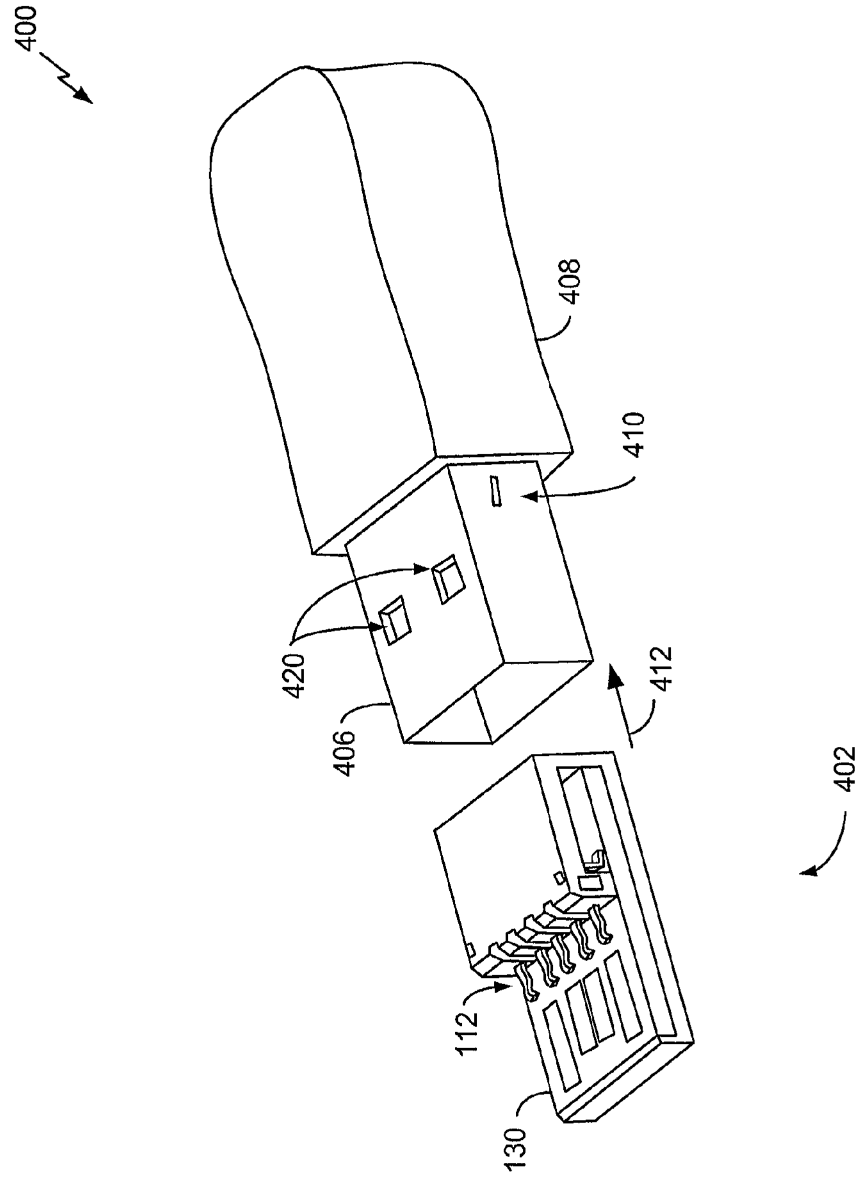
FIG. 13 is a diagram of an illustrative embodiment of a connectorized memory module being front loaded into a conductive shroud.

FIG. 13 illustrates front insertion 412 of a connectorized memory module 402 into a conductive shroud 406, as shown and generally designated 400. The connectorized memory module 402 may include the connectorized memory module 706 of FIGS. 7 and 8 or the connectorized memory module 1106 of FIGS. 11 and 12.

The conductive shroud 406 may include a metal, a metal alloy, or other conductive material, that is formable into a shroud (e.g., a shell configured to receive a connectorized memory module). In a particular embodiment, the conductive shroud is a metal shield (e.g., a metal shell). In another particular embodiment, at least a portion of the conductive shroud 406 includes a conductive material. A configuration of the conductive shroud 406 may comply with one or more universal serial bus (USB) standards, such as the USB 2.0 standard and the USB. 3.0 standard.

The conductive shroud 406 may include one or more locking tabs, such as the locking tabs 410, and one or more recesses or indentations (not shown). The locking tabs 410 may be positioned and dimensioned to engage the recess(es) 120 of FIGS. 1 and 2 or the recess(es) 320 of FIGS. 9-12, and the one or more recesses 420 of the conductive shroud 406 may engage one or more protrusions (not shown) of the connectorized memory module 402, such as the protrusions 208 of FIGS. 5 and 6 or the protrusions 322 of FIGS. 9 and 10, to secure the connectorized memory module 402 relative to the conductive shroud 406. The connectorized memory module 402 engaged with the conductive shroud 406 may form a USB device, such as a USB connector (e.g., a plug) operatively coupled to a controller and flash memory to enable access to the flash memory via a USB protocol, such as via a USB mass media storage device class protocol. Access to the flash memory may include reading data from the flash memory, writing data to the flash memory, or a combination thereof.

The conductive shroud 406 may be coupled to a lid set 408. The conductive shroud 406 and the lid set 408 may be coupled as a result of an injection molding process in which the lid set 408 was formed.

As shown in FIG. 13, the connectorized memory module 402 may be "front loaded" into the conductive shroud 406. The USB device, including the connectorized memory module 402 and the conductive shroud 406, may be compliant with one or more USB standards. For example, the USB device may be in compliance with the USB 2.0 standard, the USB 3.0 standard, or a combination thereof. Devices that operate in compliance with the USB 3.0 standard operate at higher speeds than devices compliant with the USB 2.0 standard and may be more sensitive to ground discharges, such as electrostatic discharges (ESDs). The USB connector of the USB device may be coupled to a mating USB connector (e.g., a receptacle) that is compliant with one or more USB standards.

Figure 14:
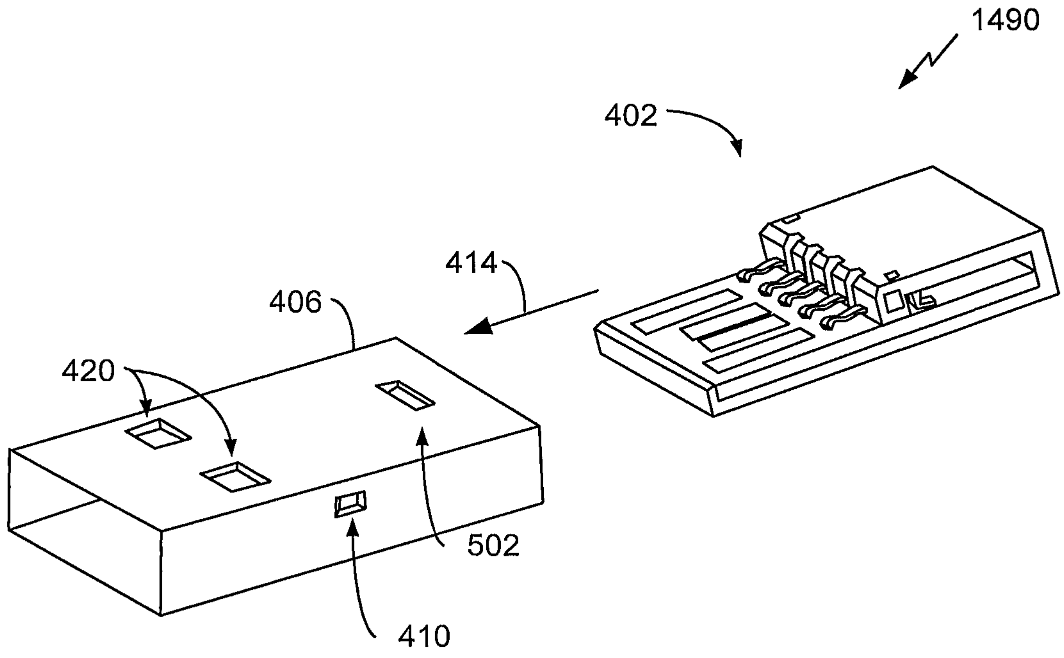
FIGS. 14 and 15 illustrate rear loading of a connectorized memory module into a conductive shroud.
Figure 15:
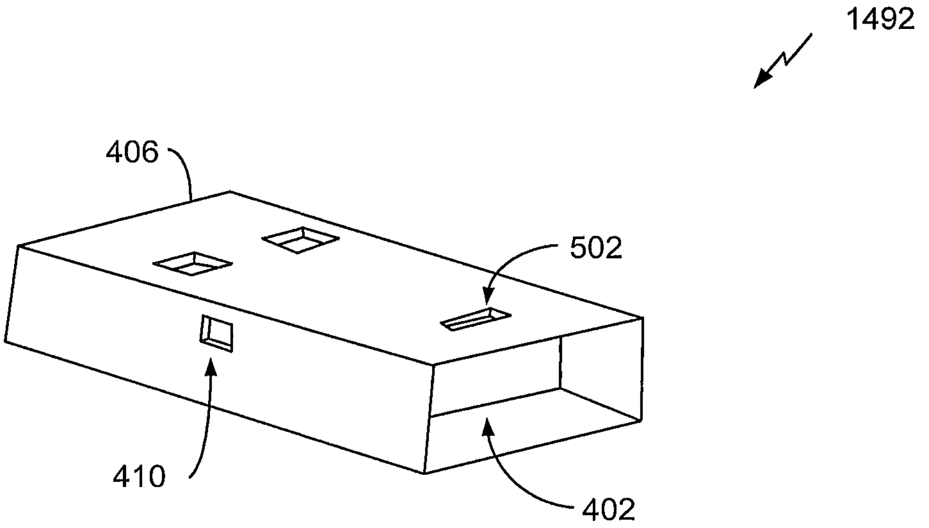

Referring to FIGS. 14 and 15, a first view 1490 and a second view 1492 illustrate rear insertion 414 of a connectorized memory module 402 into a conductive shroud 406. Rear insertion 414 may be used in conjunction with an overmolded process (e.g., an ovenmold plastic or silicone process) as described herein.

The conductive shroud 406 may include one or more recesses or indentations (not shown) and one or more locking tabs 410 including a rear locking tab 502. In a particular embodiment, the rear locking tab 502 may be used to secure the connectorized memory module 402 within the conductive shroud 406. For example, the connectorized memory module 402 may include a recess, such as the recess 204 of FIGS. 5 and 6, that is configured to engage the rear locking tab 502.

The locking tabs 410 and the one or more recesses of the conductive shroud 406 may be positioned and dimensioned engage one or more recesses 420 or one or more protrusions (not shown) of the connectorized memory module 402, such as the protrusions 208 of FIGS. 5 and 6 or the protrusions 322 of FIGS. 9 and 10, to secure the connectorized memory module 402 relative to the conductive shroud 406. The connectorized memory module 402 engaged with the conductive shroud 406 may form a USB device, such as a USB connector (e.g., a plug) operatively coupled to a controller and flash memory to enable access to the flash memory via a USB protocol, such as via a USB mass media storage device class protocol.

As shown in the first view 1490, the connectorized memory module 402 may be "rear loaded" into the conductive shroud 406. As shown in the second view 1492, the connectorized memory module 402 is secured within the conductive shroud 406. Once the connectorized memory module 402 is inserted into the conductive shroud 406, a rear end of the USB device is sealed for the overmolded process. The overmolded process includes molding plastic over an end of the USB device. The plastic may include one or more silicone materials that allow for a variety of soft intricate shapes and a variety of colors that may not be achieved with conventional injection molded plastics production processes.

The USB device formed by rear loading the connectorized memory module 402 into the conductive shroud 406 may be compliant with one or more USB standards. For example, the USB device may be in compliance with the USB 2.0 standard, the USB 3.0 standard, or a combination thereof. Devices that operate in compliance with the USB 3.0 standard may operate at higher speeds than devices compliant with the USB 2.0 stand and may be more sensitive to ground discharges, such as electrostatic discharges (ESDs). The USB device (as shown in the second view 1492) may be coupled to a mating USB connector, such as a USB plug or a USB receptacle, that is compliant with one or more USB standards.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A connector comprising:
- a connector module;
- a set of conductive connectors coupled to the connector module, the set of conductive connectors configured to electrically couple to a set of contacts of a memory module; and
- a ground contact coupled to the connector module, wherein the ground contact is configured to be coupled to a ground pad of the memory module via pressure applied by a conductive shroud.

2. The connector of claim 1, wherein the memory module includes a flash memory.

3. The connector of claim 1, wherein the ground contact is configured to be coupled to the ground pad of the memory module via a soldered connection.

4. The connector of claim 1, wherein the conductive shroud is a metal shield.

5. The connector of claim 1, wherein a configuration of the set of conductive connectors is compliant with a universal serial bus standard.

6. A connector comprising:
- a connector module;
- a carrier configured to receive a memory module, the carrier including a living hinge; and
- a conductive connector coupled to the connector module, the conductive connector configured to provide a solderless connection to a contact of the memory module.

7. The connector of claim 6, wherein the connector module and the carrier comprise a single piece of plastic.

8. The connector of claim 6, wherein, after the carrier has received the memory module and has been inserted into a shroud, a clamping force applied by the shroud causes the conductive connector to be in contact with the contact of the memory module.

9. The connector of claim 6, further comprising another conductive connector coupled to another contact of the memory module.

10. The connector of claim 6, further comprising a ground contact coupled to the connector module, wherein the ground contact is configured to provide a conductive path between the memory module and a conductive shroud.

11. The connector of claim 6, wherein the memory module includes a flash memory.

12. A connector comprising:
- a connector module;
- a carrier configured to receive a memory module; and
- a conductive connector coupled to the connector module, the conductive connector configured to provide a solderless connection to a contact of the memory module wherein, when the carrier has received the memory module and is inserted into a conductive shroud, a clamping force applied by the conductive shroud causes the conductive connector to be in contact with the contact of the memory module.

13. The connector of claim 12, wherein the carrier includes a hinge configured to enable reception of the memory module.

14. The connector of claim 13, wherein the hinge is a living hinge.

15. The connector of claim 12, wherein the connector module and the carrier comprise a single piece of plastic.

16. The connector of claim 12, further comprising another conductive connector coupled to another contact of the memory module.

17. The connector of claim 12, further comprising a ground contact coupled to the connector module, wherein the ground contact is configured to provide a conductive path between the memory module and a conductive shroud.

18. The connector of claim 12, wherein the memory module includes a flash memory.

* * * * *